United States Patent
Choi et al.

(10) Patent No.: US 9,735,704 B2
(45) Date of Patent: Aug. 15, 2017

(54) APPARATUS FOR CONTROLLING INVERTER CURRENT AND METHOD OF OPERATING THE SAME

(71) Applicant: Infineon Technologies Korea Co. Ltd., Seoul, Gangnam-gu (KR)

(72) Inventors: Yun Kyu Choi, Gyeonggi-do (KR); Hye Seong Heo, Seoul (KR)

(73) Assignee: Infineon Technologies Korea Co. Ltd., Seoul (KR)

( * ) Notice: Subject to any disclaimer, the term of this patent is extended or adjusted under 35 U.S.C. 154(b) by 149 days.

(21) Appl. No.: 13/868,879

(22) Filed: Apr. 23, 2013

(65) Prior Publication Data

US 2013/0279225 A1 Oct. 24, 2013

(30) Foreign Application Priority Data

Apr. 23, 2012 (KR) .................. 10-2012-0042251
May 30, 2012 (KR) .................. 10-2012-0057097

(51) Int. Cl.
| | |
|---|---|
| H02M 7/44 | (2006.01) |
| H02M 7/5387 | (2007.01) |
| H02M 1/00 | (2006.01) |

(52) U.S. Cl.
CPC .................. *H02M 7/53873* (2013.01); *H02M 2001/0009* (2013.01)

(58) Field of Classification Search
CPC .. H02M 1/32; H02M 7/5387; H02M 3/33507; H02M 7/53871; H02M 7/537

(Continued)

(56) References Cited

U.S. PATENT DOCUMENTS

| | | | | |
|---|---|---|---|---|
| 5,349,351 A | * | 9/1994 | Obara ................. | H03M 1/1225 318/599 |
| 5,787,125 A | * | 7/1998 | Mittel ..................... | H03C 3/40 375/316 |

(Continued)

FOREIGN PATENT DOCUMENTS

| | | |
|---|---|---|
| JP | H10150764 A | 6/1998 |
| KR | 10-2011-0126857 A | 11/2011 |

OTHER PUBLICATIONS

Luckjiff et al., "Interpolative Sigma Delta Modulators for High Frequency Power Electronic Applications," 26th Annual IEEE Power Electronics Specialists Conference, Jun. 18-22, 1995, vol. 1, pp. 444-449.

*Primary Examiner* — Alex Torres-Rivera
(74) *Attorney, Agent, or Firm* — Shumaker & Sieffert, P.A.

(57) ABSTRACT

Provided is an apparatus for controlling an inverter current, and more particularly, to a current controlling apparatus for controlling current of a switching element of an inverter that outputs a 3-phase alternating current. The apparatus for controlling an inverter current includes: an inverter comprising a plurality of current detection switching elements capable of detecting switched and output current, converting a direct current voltage into a 3-phase alternating current by turning the plurality of current detection switching elements on and off; an AD converter for directly receiving an input of an output current of an output terminal of each of the plurality of current detection switching elements as a detection current and converting the detection current into a detection signal value in digital form; and a control unit for controlling on and off of the plurality of current detection switching elements by using the detection signal value.

8 Claims, 5 Drawing Sheets

(58) Field of Classification Search
USPC ...... 363/55, 56.01, 56.02, 56.03, 95, 97, 98, 363/131, 132
See application file for complete search history.

(56) References Cited

U.S. PATENT DOCUMENTS

| | | | | |
|---|---|---|---|---|
| 2003/0184326 | A1* | 10/2003 | Throngnumchai | H02M 1/32 324/713 |
| 2005/0128110 | A1* | 6/2005 | Uramoto | G11B 20/10527 341/110 |
| 2005/0218853 | A1* | 10/2005 | Kokami | 318/599 |
| 2007/0284664 | A1* | 12/2007 | Okuda et al. | 257/355 |
| 2008/0265829 | A1* | 10/2008 | Hayashi | H02P 21/18 318/781 |
| 2009/0118989 | A1* | 5/2009 | Padhi | G01L 23/225 701/111 |
| 2009/0161392 | A1* | 6/2009 | Zhang | H02M 7/5387 363/40 |
| 2010/0079323 | A1* | 4/2010 | Miao | 341/142 |
| 2011/0080125 | A1* | 4/2011 | Shimada et al. | 318/400.09 |
| 2011/0156625 | A1* | 6/2011 | Kurosawa et al. | 318/400.09 |
| 2013/0033205 | A1* | 2/2013 | Furukawa | H02P 21/0003 318/400.02 |

* cited by examiner

APPARATUS FOR CONTROLLING INVERTER CURRENT AND METHOD OF OPERATING THE SAME

This application claims priority to the following Korean Patent Applications:

Korean Patent Application 10-2012-0042251, filed Apr. 23, 2012; and

Korean Patent Application 10-2012-0057097, filed May 30, 2012. Translations of the Korean Patent Applications are also included with this application, and the entire content of each of the translations is expressly incorporated herein and forms part of this application.

TECHNICAL FIELD

The present invention relates to an apparatus for controlling an inverter current, and more particularly, to a current controlling apparatus for controlling current of a switching element of an inverter that outputs a 3-phase alternating current.

BACKGROUND

Vehicles such as hybrid cars or electric cars drive a driving motor or a motor of a compressor by using a high voltage battery and drive an audio device or a communication device such as a local interconnect network (LIN) or a controller area network (CAN) by using a low voltage battery. In such a construction, for example, in a case where a motor control unit that controls an operation of an inverter apparatus and a communication control unit that controls an operation of the communication device transmit and receive signals between each other, a photo coupler is used to transmit and receive signals.

In general, an apparatus for controlling an inverter 40 and driving a motor 60, as shown in FIG. 1, includes a high voltage battery 10, a voltage converter 20 that converts a voltage of the high voltage battery 10 into another voltage, a smoothing unit (a filter condenser) 30 that stores and smoothes out the converted voltage, the inverter (a D/C converter) 40 that converts a direct current voltage of the smoothing unit 30 into an alternating current voltage, the motor 60 driven by the alternating current voltage of the inverter 40, and a control unit 50 that controls an output frequency.

The inverter 40 uses switching elements which are connected. In general, a semiconductor element that is an insulated gate bipolar transistor (IGBT) having an excellent characteristic as a switching element is mainly used.

If an output short or an arm short occurs in the inverter 40 and a short current flows through the IGBT that is the switching element, the short current of the switching element increases to a maximum current allowed by a gate-emitter voltage (VGE) applied to the switching element, and a collector-emitter voltage (VCE) of the switching element increases in proportional to the current. In a case where an uncontrolled current (hereinafter referred to as an "accident current") flows in the IGBT that is the switching element of the inverter 40 due to the short current as described above, an appropriate measure needs to be taken by detecting the accident current.

To this end, conventionally, a separate detection dedicated circuit that controls current and detects a short current by using current values detected by phase output current detection sensors 70 (70a, 70b, and 70c) installed at a phase output for current control needs to be provided.

For example, in a normal case, if the switching element is turned on, an input voltage VCC is connected to ground GND through a pull-up resistance, a current limitation resistance, a blocking diode, and the switching element. In this regard, a turn-on voltage of the switching element is only detected to perform a normal operation. To the contrary, in a case where the switching element is turned off, the turn-on voltage of the switching element increases in proportional to a size of the short current and is compared to a reference voltage of a comparison unit to determine whether the short current is detected, and a failure signal is transmitted to the control unit 50.

However, the apparatus for controlling the inverter 40 including the detection dedicated circuit having a function of detecting the short current according to the conventional art needs a separate current detection sensor, which problematically causes an increase in cost. Further, the apparatus for controlling the inverter 40 separately performs current detection sensing, which problematically increases a load of a control unit. Furthermore, the conventional current detection sensor is problematically incapable of adjusting a short current detection level.

DETAILED DISCLOSURE

Technical Goal of the Invention

The present invention provides detecting current that flows through a switching element without a separate current detection sensor. The present invention also provides a method and apparatus for controlling an inverter current without a separate current detection sensor. The present invention also provides protecting a system for controlling an inverter current by directly detecting current that flows through a switching element. The present invention also provides reducing a digital modulation time of a detected current.

Examples for Achieving Technical Goal

According to an aspect of the present invention, there is provided an apparatus for controlling an inverter current, the apparatus including: an inverter including a plurality of current detection switching elements capable of detecting switched and output current, converting a direct current voltage into a 3-phase alternating current by turning the plurality of current detection switching elements on and off; an AD converter for directly receiving an input of an output current of an output terminal of each of the plurality of current detection switching elements as a detection current and converting the detection current into a detection signal value in digital form; and a control unit for controlling on and off of the plurality of current detection switching elements by using the detection signal value.

The plurality of current detection switching elements may be implemented by connecting in parallel two insulated gate bipolar transistors (IGBTs). The plurality of current detection switching elements may be implemented as a first IGBT and a second IGBT, wherein the first IGBT includes: a first collector connected to an input terminal to which a direct current is input; a first gate to which a control current is input; and a first emitter that is a first output terminal connected to a motor, and wherein the second IGBT includes: a second collector connected to a node between the input terminal and the first collector; a second gate to which a signal that is the same as the control current is input; and a second emitter that is a second output that outputs the detection current.

The AD converters includes: a sigma-delta modulation unit for converting the detection current into a digital signal through compensation using an error between a previously predicted prediction value and an actually detected detection current. The AD converter further includes: a first filtering unit for performing aliasing blocking filtering on the digital signal; and a second filtering unit for performing low pass filtering on a down-sampled digital signal.

The first filtering unit may perform down-sampling after performing aliasing blocking filtering. The second filtering unit may perform down-sampling after performing low pass filtering on a signal input from the first filtering unit.

The first filtering unit may be a comb filter that is a comb pattern filter. The second filtering unit may be a finite impulse response (FIR) filter.

Example Effect of the Invention

According to an embodiment of the present invention, current that flows through a switching element is directly detected without a separate current detection sensor, thereby implementing a circuit simplification. Further, cost may be reduced using an apparatus for controlling an inverter current. According to an embodiment of the present invention, the current that flows through the switching element is directly detected, thereby implementing a prompt current control. Furthermore, according to an embodiment of the present invention, it may be directly and exactly detected whether the switching element is defective. Furthermore, according to an embodiment of the present invention, sigma-delta modulation is used to minimize a digital modulation time, which reduces a load of a control unit and readily implements an additional control operation, thereby facilitating a resource allocation.

DESCRIPTION OF EMBODIMENT

Figure 1:
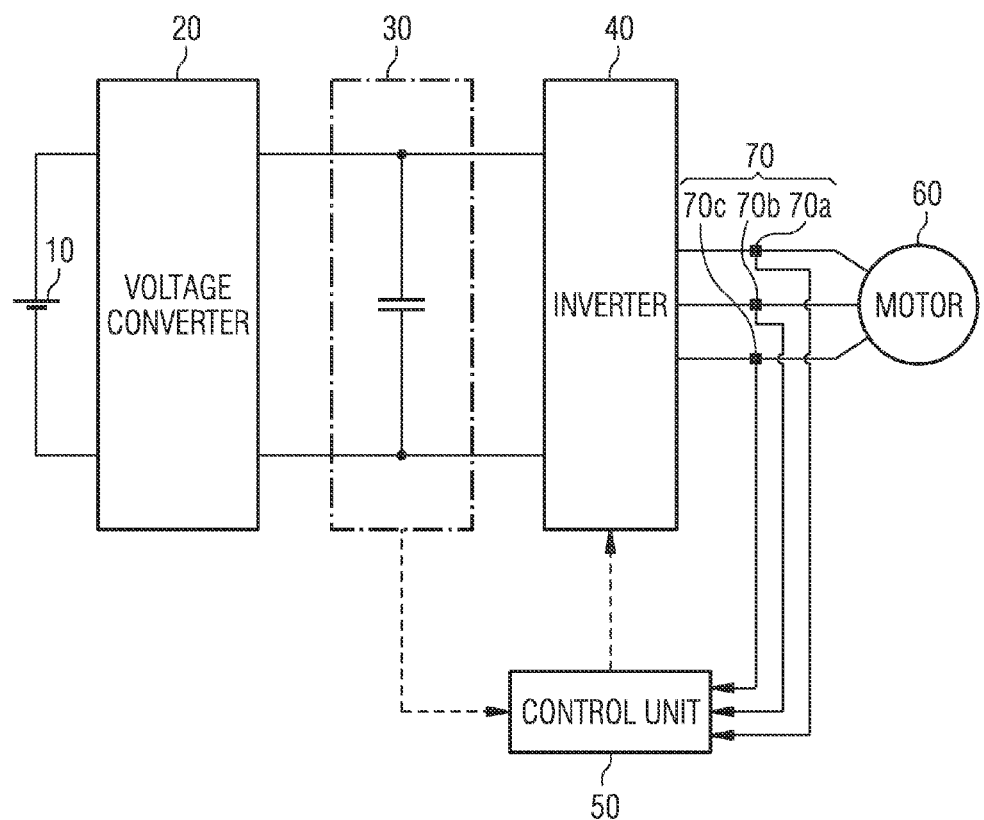
FIG. 1 is a diagram of a conventional apparatus for controlling an inverter and driving a motor.

The present invention will now be described more fully with reference to the accompanying drawings, in which exemplary embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Like reference numerals in the drawings denote like elements.

Figure 2:
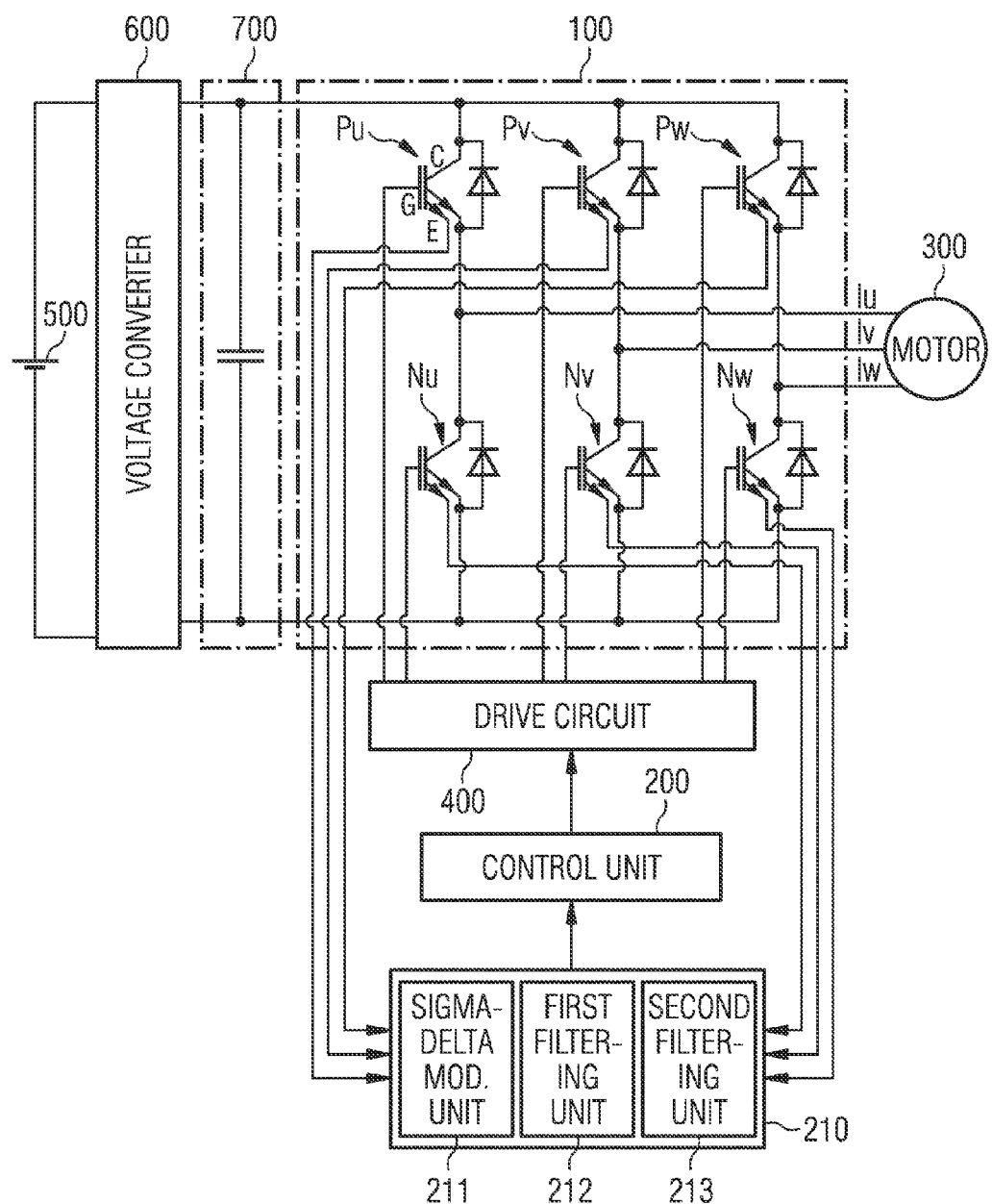
FIG. 2 is a diagram of a short current detection circuit of an inverter, according to an embodiment of the present invention.

FIG. 2 is a diagram of a short current detection circuit of an inverter, according to an embodiment of the present invention.

Referring to FIG. 2, a current control apparatus for controlling an inverter 100 and driving a motor 300 includes a high voltage battery 500, a voltage converter 600 that converts a voltage of the high voltage battery 500 into a direct current voltage, a smoothing unit (a filter condenser) 70 that stores and smoothes out the converted voltage, the inverter 100 that converts a direct current voltage of the smoothing unit 70 into an alternating current voltage, turns the current detection switching elements on and off, converts an alternating current into 3-phase current, and outputs the 3-phase current to the motor 300, wherein the inverter 100 includes a plurality of current detection switching elements capable of detecting switched and output current, an AD converter 210 that directly receives an input of an output current of outputs of the current detection switching elements as a detection current, and converts the detection current into a detection signal value in a digital form, and a control unit 200 that outputs driving signals used to control on and off of the current detection switching elements by using the detection signal value. In addition, the current control apparatus includes a drive circuit 400 that generates gate signals used to directly control on and off of the current detection switching elements according to control signals of the control unit 200.

The inverter 100 is used to drive a compressor motor mounted on a vehicle such as a hybrid car or an electric car. The inverter 100 includes the plurality of current detection switching elements, turns the current detection switching elements on and off, converts the alternating current into the 3-phase current, and outputs the 3-phase current to the motor 300. For example, the inverter 100 is configured to include an n-channel first current detection switching element Pu and a second current detection switching element Nu that are connected to each other in series and output a U phase, an n-channel third current detection switching element Pv and a fourth current detection switching element Nv that are connected to each other in series and output a V phase, and an n-channel fifth current detection switching element Pw and a sixth current detection switching element Nw that are connected to each other in series and output a W phase, which are in parallel connected to the high voltage battery 500. The first current detection switching element Pu, the third current detection switching element Pv, and the fifth current detection switching element Pw are switching elements that respectively output three positive U, V, and W phase currents. The second current detection switching element Nu, the fourth current detection switching element Nv, and the sixth current detection switching element Nw are switching elements that respectively output three negative U, V, and W phase currents. For reference, diodes D for current blocking are connected in parallel between a collector C and an emitter E in each of the current detection switching elements Pu, Pv, Pw, Nu, Nv, and Nw.

A connection point node between the first current detection switching element Pu and second current detection switching element Nu and the U phase of the motor 300 are connected to each other. A connection point node between the third current detection switching element Pv and fourth current detection switching element Nv and the V phase of the motor 300 are connected to each other. A connection point node between the fifth current detection switching element Pw and sixth current detection switching element Nw and the W phase of the motor 300 are connected to each other. The current detection switching elements Pu, Pv, Pw, Nu, Nv, and Nw are sequentially turned on and off, and thus a plurality of alternating currents flow through the motor 300 so that the rotor of the motor 300 rotates.

Each of the current detection switching elements Pu, Pv, Pw, Nu, Nv, and Nw constituting the inverter 100 switches current that is input to an input collector terminal and outputs the switched current as an output current from the emitter E. The embodiment of the present invention provides a solution of directly detecting a value of the output current output from the emitter E without a separate detection sensor and providing the output current value to the control unit 200. To this end, each of the current detection switching elements Pu, Pv, Pw, Nu, Nv, and Nw is implemented as a parallel combination of two insulated gate bipolar transistors (IGBTs) so as to detect the output current value. For reference, FIG. 2 simply shows two emitters so as to describe the parallel combination of two IGBTs.

Figure 3:
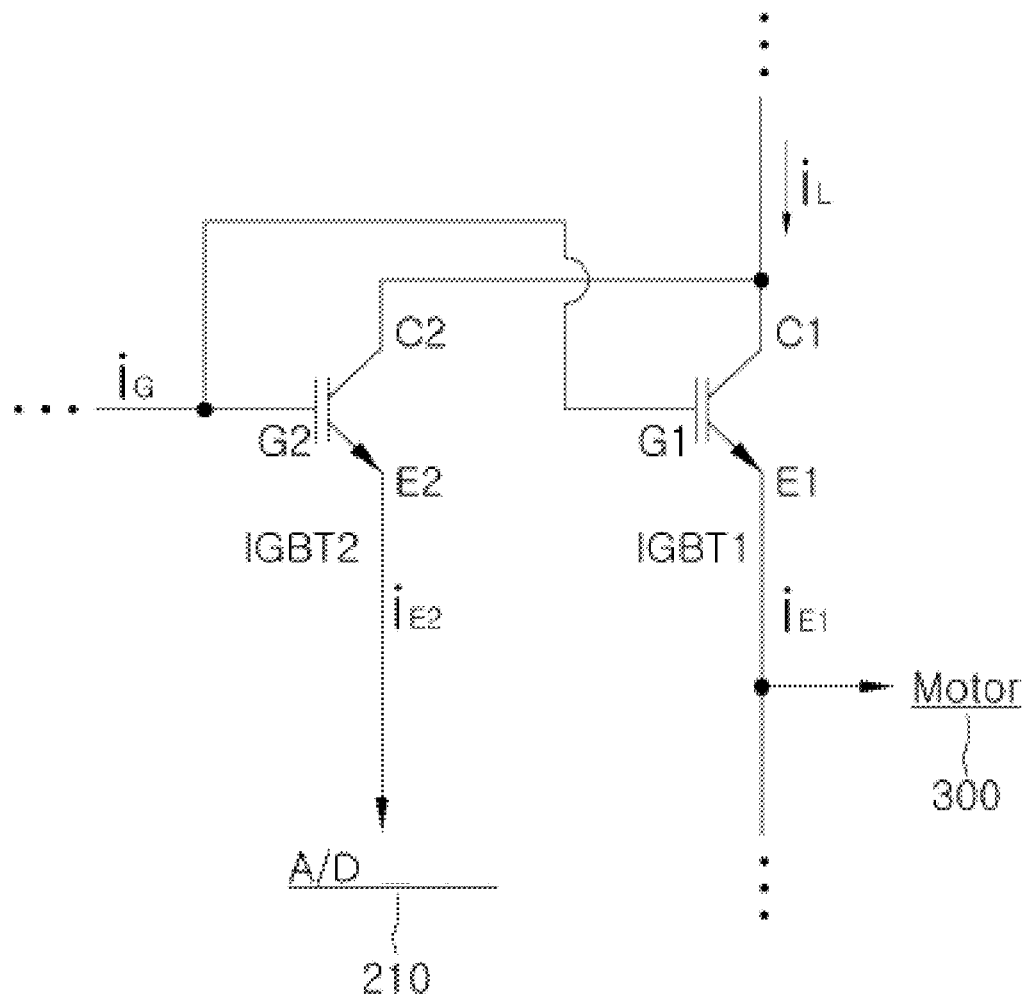
FIG. 3 is a diagram of current detection switching elements integrated as a the on-chip current sense-insulated gate bipolar transistor (TCS-IGBT) structure, according to an embodiment of the present invention.

In more detail, as shown in FIG. 3, the parallel combination of two IGBTs is implemented as an on-chip current sense-insulated gate bipolar transistor (TCS-IGBT) structure by integrating the current detection switching elements Pu, Pv, Pw, Nu, Nv, and Nw. A TCS-IGBT element is implemented by combining in parallel two IGBTs, for example, IGBT1 and IGBT2, in which a first IGBT IGBT1 provides the output current to the motor 300, and a second IGBT IGBT2 outputs the same value as the output current provided to the motor 300 and provides the output value to the AD converter 210.

To this end, the first IGBT IGBT1 includes a first collector C1 connected to an input terminal to which the direct current is input, a first gate G1 to which a control current is input as a gate signal, and a first emitter E1 that is a first output terminal connected to the motor 300. The second IGBT IGBT2 includes a second collector C2 connected to a node between the input terminal and the first collector C1, a second gate G2 to which the same control current as that input to the first gate G1 is input, and a second emitter E2 that is a second output terminal that outputs the detection current.

Therefore, an input current $i_L$ that is input to the current detection switching elements Pu, Pv, Pw, Nu, Nv, and Nw is equally input to both input terminals that are the first collector C1 of the first IGBT IGBT1 and the second collector C2 of the second IGBT IGBT2, and a gate signal $i_G$ that is a control signal input to the current detection switching elements Pu, Pv, Pw, Nu, Nv, and Nw is equally input to both the first gate G1 of the first IGBT IGBT1 and the second gate G2 of the second IGBT IGBT2. Thus, current $i_{E1}$ that flows from the first emitter E1 that is an output terminal of the first IGBT IGBT1 and current $i_{E2}$ that flows from the second emitter E2 that is an output terminal of the second IGBT IGBT2 have the same value. The current $i_{E1}$ output from the first emitter E1 of the first IGBT IGBT1 is provided to the motor 300 and used as a driving source, and the current $i_{E2}$ output from the second emitter E2 of the second IGBT IGBT2 is provided to the AD converter 210 as the detection current.

Although the integrated first IGBT IGBT1 and second IGBT IGBT2 are included in both positive and negative sides in the present embodiment, the integrated first IGBT IGBT1 and second IGBT IGBT2 may be modified in various ways like the integrated first IGBT IGBT1 and second IGBT IGBT2 are included in the negative side to measure phase current.

Although an example of using IGBTs as current detection switching elements of the inverter 100 is described in the embodiment of the present invention, the present invention is not limited thereto. It will be obvious that other switching elements may be applied to the embodiment of the present invention. That is, each of current detection switching elements constituting the inverter 100 may use a metal oxide semiconductor field effect transistor (MOSFET) in which diodes are connected to each other in parallel, in addition to IGBTs, and thus current detection switching elements are not limited to IGBTs.

For reference, the IGBT is configured to have an advantage of a MOSFET and a bipolar transistor. The IGBT may be considered as an element that substantially replaces the MOSFET. The MOSFET is an element driven by using a single electron or hole so that an increase in a breakdown voltage or a current amount is limited. Thus, the IGBT may supplement such a disadvantage of the MOSFET and obtain a high breakdown voltage and current. However, the speed of the IGBT is disadvantageously slower than that of the MOSFET. A characteristic of the IGBT element is in brief that the IGBT has the same voltage control method as the MOSFET and has a low ON-resistance and thus is being widely used in a high power element. Upon comparing the MOSFET and the IGBT in terms of the ON-resistance per voltage, an electric conductive resistance is lower in the IGBT than in the MOFET in a wide voltage range. Upon comparing characteristics of the IGBT, the MOSFET, and a BJT that are switching elements, the IGBT and the MOSFET are controlled using voltages, whereas the BJT is controlled using current in terms of an input type, and the IGBT and the MOSFET have a very high input resistance, whereas the BJT has a lower resistance. Further, in terms of an operating frequency, the IGBT has an intermediate operating frequency, the MOSFET has a high operating frequency, and the BJT has a low operating frequency, and in terms of a switching speed, the IGBT has an intermediate switching speed, the MOSFET has a very high switching speed, and the BJT has a low switching speed.

The control unit 200 obtains a current position of a rotor of the motor 300 based on 3-phase currents Iu, Iv, and Iw, obtains respective 3-phase voltages of U, V, and W phases based on the current position of the rotor and a command message input from the outside, and generates respective drive signals for controlling on and off of the current detection switching elements Pu, Pv, Pw, Nu, Nv, and Nw through pulse width modulation (PWM) by using the 3-phase voltages and a triangular reference wave. The control unit 200 also transmits and receives a signal to and from an apparatus for controlling an operation of a communication device such as a local interconnect network (LIN) or a controller area network (CAN).

The control unit 200 receives a digital output value of each of the current detection switching elements Pu, Pv, Pw, Nu, Nv, and Nw from the AD converter 210, determines whether current of each of the current detection switching elements Pu, Pv, Pw, Nu, Nv, and Nw normally flows, thereby promptly detecting whether an abnormal status such as a short current occurs. For example, in a case where a short current flows in each of the current detection switching elements Pu, Pv, Pw, Nu, Nv, and Nw, the control unit 200 detects the short current status by determining whether the output current value of each of the current detection switching elements Pu, Pv, Pw, Nu, Nv, and Nw is a short current value. For reference, the current detected by each of the current detection switching elements Pu, Pv, Pw, Nu, Nv, and Nw may be used to detect the short current as well as may be used in a current control with respect to each of the current detection switching elements Pu, Pv, Pw, Nu, Nv, and Nw.

The drive circuit 400 generates and outputs the control signal output by the control unit 200 as a gate signal input to a gate of each of the current detection switching elements Pu, Pv, Pw, Nu, Nv, and Nw. That is, the drive circuit 400 generates a current signal in accordance with an operating specification of each of the current detection switching elements Pu, Pv, Pw, Nu, Nv, and Nw and provides the current signal to a gate terminal of each of the current detection switching elements Pu, Pv, Pw, Nu, Nv, and Nw to perform on and off switching operations.

The AD converter 210 directly receives the input of the output current of the output terminal of each of the current detection switching elements Pu, Pv, Pw, Nu, Nv, and Nw as the detection current, and converts the detection current into a detection signal value in digital form, and provides the detection signal value to the control unit 200. To this end, the AD converter 210 includes a sigma-delta modulation unit 211 that converts the detection current into a digital signal for each phase through a compensation using an error between a previously predicted prediction value and an actually detected detection current into a digital signal. In addition, the AD converter 210 further includes a first filtering unit 212 that performs aliasing blocking filtering on the digital signal and a second filtering unit 213 that performs low pass filtering on a down-sampled digital signal.

Figure 4:
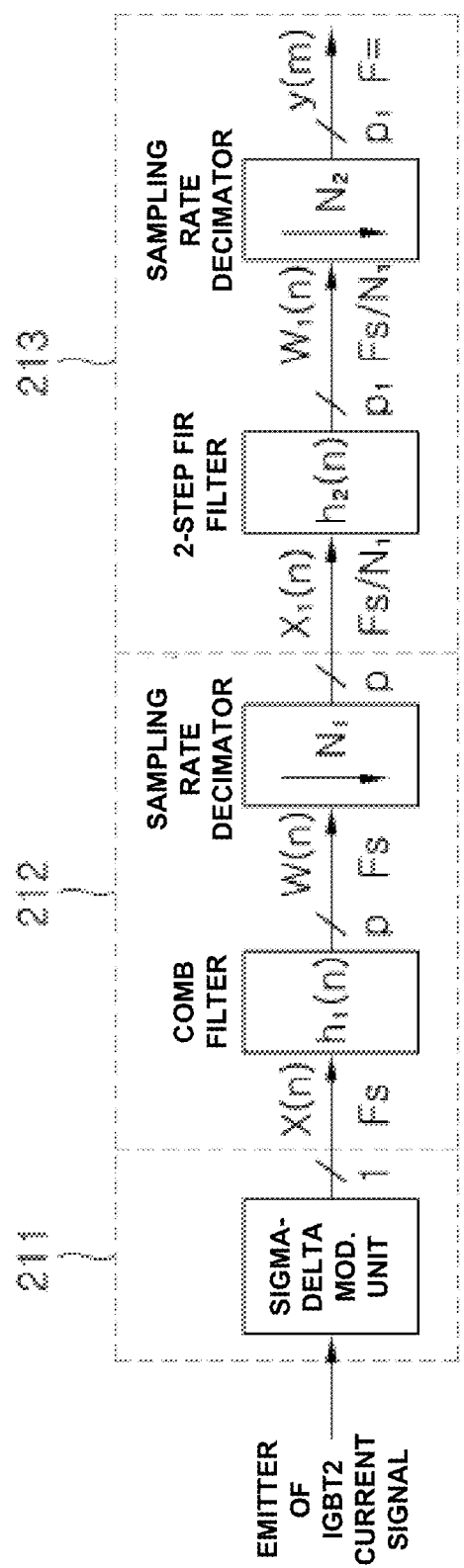
FIG. 4 is a diagram of a detailed construction of a sigma-delta modulation unit, a first filtering unit, and a second filtering unit of an AD converter, according to an embodiment of the present invention.

In addition to the sigma-delta modulation unit 211, in a case where the AD converter 210 further includes the first filtering unit 212 and the second filtering unit 213, sigma-delta modulation, aliasing blocking, and low pass filtering are sequentially performed. FIG. 4 is a diagram of a detailed construction of the sigma-delta modulation unit 211, the first filtering unit 212, and the second filtering unit 213 of the AD converter 210, according to an embodiment of the present invention.

The sigma-delta modulation unit 211 (Σ-Δ modulator) uses a delta conversion method (analog-to-digital derived from delta modulation). An analog-to-digital converter (ADC) circuit to which the delta conversion method is applied is easily implemented by low cost CMOS processing and is widely used owing to the development of a semiconductor technology.

Figure 5A:
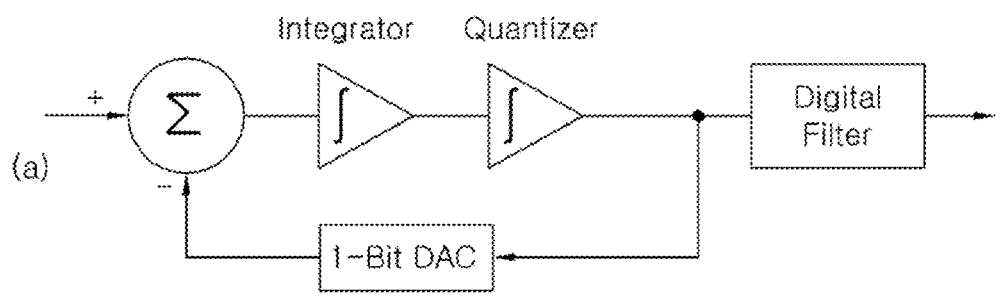
FIG. 5A and FIG. 5B are diagrams for explaining sigma-delta modulation principles
Figure 5B:
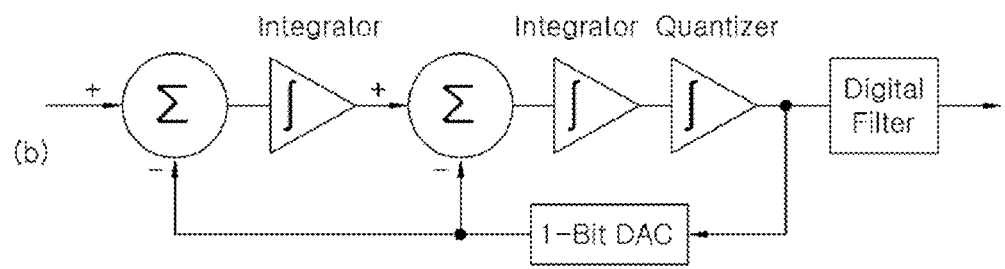

A sigma-delta modulation principle approximately predicts a value of a signal, obtains an error, compensates for the error by using accumulated errors, and converts a signal into a digital signal as shown in FIG. 5A. According to the sigma-delta modulation principle, if the accumulated error value is finite, an average value of input signals and an average value of output signals is the same. The number of integrators determines an order of sigma-delta modulation. FIG. 5B shows an example of second sigma-delta modulation. Although first sigma-delta modulation is stable, the higher the order of sigma-delta modulation, the more the stability needs to be concerned. The sigma-delta modulation unit 211 is applied in the embodiment of the present invention as described above, and thus two insulated channel lines are necessary for a data input and high resolution is implemented.

Meanwhile, after the sigma-delta modulation unit 211 converts a signal into the digital signal, the digital signal may be output to the first filtering unit 212 and the second filtering unit 213 to stabilize the digital signal.

The first filtering unit 212 performs aliasing blocking filtering on the digital signal. A comb filter is used as the first filtering unit 212. Aliasing is a signal distortion phenomenon in which when an analog signal is sampled, a sampling frequency is smaller than 2 times the maximum frequency of a signal or filtering is inappropriate, thus adjacent spectrums overlap each other. To avoid such a phenomenon, the sampling frequency needs to be increased to be greater than 2 times the maximum frequency of the signal, and signals higher than the maximum frequency needs to be removed by using a low pass wave filter before sampling is performed. The first filtering unit 212 filters and removes aliasing by using the comb filter.

Figure 6:
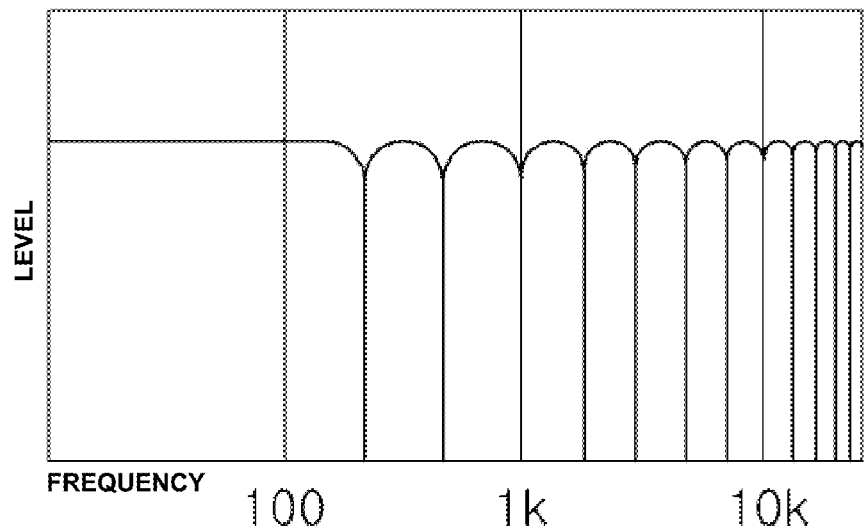
FIG. 6 is a diagram of an example of a filtering band of a comb filter.

The comb filter is a band pass filter having many comb shapes (unique frequency ribs) according to a frequency characteristic, as shown in FIG. 6. Thus, if the digital signal passes through the comb filter having a frequency of a corresponding phase of a detection current of a channel input from each of the current detection switching elements Pu, Pv, Pw, Nu, Nv, and Nw as a comb band, the detection current of each channel is selected and attenuated by the comb band. Meanwhile, the digital signal is firstly filtered to the comb band through the comb filter, is down-sampled, and is transferred to the second filtering unit 213. Such down-sampling is performed by a decimator. The decimator performs down-sampling on a clock frequency of the digital signal at a sampling rate that may be processed by a digital processor, divides the clock frequency by a sampling factor N, and performs down-sampling at a specific sampling rate.

The second filtering unit 213 low pass filters and outputs the digital signal. Low pass filtering of the second filtering unit 213 may be used to perform a compensation filtering function that compensates for pass band dropping by using the comb filter. The second filtering unit 213 is implemented as a finite impulse response (FIR) filter to stabilize the digital signal through band filtering. The FIR filter is a digital filter having a finite continuation time of an impulse response, and is implemented as a 2-step FIR filter having two bands in the embodiment of the present invention. Filtering is performed in two low pass bands through the 2-step FIR filter. 2-step low pass filtering is merely used to obtain a signal of a low frequency band and an order thereof may be applied in various ways. Meanwhile, likewise, the digital signal is secondly filtered, is down-sampled, and is output. The down-sampling is performed by the decimator.

As described above, an emitter current of integrated IGBTs and an AD converter for performing sigma-delta modulation are used, and thus a signal detected by the IGBTs is directly used by excluding a separate current detection sensor, thereby protecting a system circuit. Simultaneously with this, sigma-delta modulation is used to minimize a digital modulation time, which reduces a load of a control unit and readily implements an additional control operation, thereby facilitating a resource allocation.

While the present invention has been particularly shown and described with reference to exemplary embodiments thereof, it will be understood by those of ordinary skill in the art that various changes in form and details may be made therein without departing from the spirit and scope of the present invention as defined by the following claims.

EXPLANATION OF REFERENCE NUMERALS DESIGNATING THE MAJOR ELEMENTS OF THE DRAWINGS

100: inverter
210: AD converter
200: control unit
211: sigma-delta modulation unit -continued

| 212: first filtering unit | 213: second filtering unit |
|---|---|
| 300: motor | 400: drive circuit |
| Pu, Pv, Pw: positive phase current generation switching elements | |
| Nu, Nv, Nw: negative phase current generation switching elements | |

FIG. 1:
20 CONVERTER
40 INVERTER
50 CONTROL UNIT
60 MOTOR
FIG. 2:
200 CONTROL UNIT
211 SIGMA-DELTA MODULATION UNIT
212 FIRST FILTERING UNIT
213 SECOND FILTERING UNIT
300 MOTOR
400 DRIVE CIRCUIT
600 CONVERTER
FIG. 3:
210 AD CONVERTER
FIG. 4:
IGBT2 의 이미터 EMITTER OF IGBT2
전류신호 CURRENT SIGNAL
211 SIGMA-DELTA MODULATION UNIT
212 COMB FILTER
SAMPLING RATE DECIMATOR
213 2-STEP FIR FILTER
SAMPLING RATE DECIMATOR
FIG. 6:
레벨 LEVEL
주파수 FREQUENCY

What is claimed is:

1. An apparatus controlling an inverter current, the apparatus comprising:
an inverter comprising a plurality of current detection switching elements capable of detecting switched and output current and converting a direct current voltage into a 3-phase alternating current by turning the plurality of current detection switching elements on and off;
an analog-to-digital (AD) converter directly receiving the switched and output current from an output terminal of each of the plurality of current detection switching elements as a detection current and converting the detection current into a detection signal value, wherein the detection signal value is a digital measurement of the detection current; and
a control unit adjusting, via pulse-width modulation, a duration of an on time and an off time of each of the plurality of current detection switching elements in response to the detection signal value, such that the control unit causes the plurality of current detection switching elements to convert the direct current voltage into the 3-phase alternating current, wherein the AD converter further comprises:
a first filtering unit performing aliasing blocking filtering on the digital measurement of the detection current and down-sampling after performing aliasing blocking filtering to generate a down-sampled digital signal; and
a second filtering unit performing low pass filtering on the down-sampled digital signal.

2. The apparatus of claim 1, wherein each current detection switching element of the plurality of current detection switching elements is implemented by connecting in parallel two insulated gate bipolar transistors (IGBTs).

3. The apparatus of claim 2, wherein each current detection switching element of the plurality of current detection switching elements comprises a first IGBT of the two parallel IGBTs and a second IGBT of the two parallel IGBTs, wherein the first IGBT comprises:
a first collector connected to an input terminal to which a direct current is input; a first gate to which a control current is input; and
a first emitter that is a first output terminal connected to a motor, and
wherein the second IGBT comprises:
a second collector connected to a node between the input terminal and the first collector;
a second gate to which the control current is also input; and
a second emitter that is the output terminal that outputs the detection current.

4. The apparatus of claim 1, wherein the AD converter comprises:
a sigma-delta modulation unit converting the detection current into a digital signal corresponding to the digital measurement of the detection current through compensation using an error between a previously predicted prediction value and an actually detected detection current.

5. The apparatus of claim 1, wherein the second filtering unit performs down-sampling after performing low pass filtering on the down-sampled digital signal from the first filtering unit.

6. The apparatus of claim 1, wherein the first filtering unit is a comb filter that is a comb pattern filter.

7. The apparatus of claim 1, wherein the second filtering unit is a finite impulse response (FIR) filter.

8. The apparatus of claim 7, wherein the FIR filter is a 2-step low pass filter.

* * * * *